US008816850B2

(12) United States Patent
Bandyopadhyay et al.

(10) Patent No.: US 8,816,850 B2
(45) Date of Patent: Aug. 26, 2014

(54) TRACKING AND MONITORING SYSTEM FOR OPENCAST MINES

(75) Inventors: Lakshmi Kanta Bandyopadhyay, Dhanbad (IN); Swades Kumar Chaulya, Dhanbad (IN); Pankaj Kumar Mishra, Dhanbad (IN)

(73) Assignee: Council of Scientific & Industrial Research, New Delhi (IN)

( * ) Notice: Subject to any disclaimer, the term of this patent is extended or adjusted under 35 U.S.C. 154(b) by 389 days.

(21) Appl. No.: 13/265,585

(22) PCT Filed: Mar. 29, 2010

(86) PCT No.: PCT/IN2010/000196
§ 371 (c)(1),
(2), (4) Date: Feb. 10, 2012

(87) PCT Pub. No.: WO2010/122570
PCT Pub. Date: Oct. 28, 2010

(65) Prior Publication Data
US 2012/0127924 A1 May 24, 2012

(30) Foreign Application Priority Data
Apr. 21, 2009 (IN) .............................. 832DEL/2009

(51) Int. Cl.
*G08B 21/00* (2006.01)
*E21F 17/18* (2006.01)
*G01S 5/02* (2010.01)
*G08G 1/16* (2006.01)

(52) U.S. Cl.
CPC *G08G 1/16* (2013.01); *E21F 17/18* (2013.01); *G01S 5/02* (2013.01)
USPC .................. 340/539.17; 340/572.1; 340/10.1; 340/539.16; 340/989; 340/8.1; 455/404.1; 455/404.2; 379/45

(58) Field of Classification Search
USPC .......... 340/539.16, 539.17, 988, 989, 426.18; 455/404.1, 404.2; 379/45
See application file for complete search history.

(56) References Cited

U.S. PATENT DOCUMENTS

| | | | | |
|---|---|---|---|---|
| 5,012,411 | A * | 4/1991 | Policastro et al. | 600/485 |
| 6,226,572 | B1 * | 5/2001 | Tojima et al. | 701/23 |
| 2005/0200479 | A1 * | 9/2005 | James | 340/539.18 |
| 2007/0264967 | A1 * | 11/2007 | Collins et al. | 455/404.2 |
| 2011/0205033 | A1 * | 8/2011 | Bandyopadhyay et al. | 340/10.51 |

FOREIGN PATENT DOCUMENTS

| | | |
|---|---|---|
| DE | 10 2007 039 252 | 2/2009 |
| JP | 2007-272487 | 10/2007 |
| JP | 2009-251876 | 10/2009 |
| WO | 03/049062 | 6/2003 |
| WO | 2009/118762 | 10/2009 |

OTHER PUBLICATIONS

Bandoopadhyay et al., "Wireless Information and Safety System for Underground Mines", General Assembly of the URSI in Chicago, IL, Aug. 2008 (4 pages).
International Preliminary Report on Patentability (Form PCT/IB/373) dated Oct. 25, 2011 in PCT/IN2010/000196, filed Mar. 29, 2010.
International Search Report (Form PCT/ISA/210) mailed Aug. 6, 2010 in PCT/IN2010/000196, filed Mar. 29, 2010.
Written Opinion (Form PCT/ISA/237) mailed Aug. 6, 2010, in PCT/IN2010/000196, filed Mar. 29, 2010.

* cited by examiner

*Primary Examiner* — Nabil Syed
*Assistant Examiner* — Mark Rushing
(74) *Attorney, Agent, or Firm* — Abelman, Frayne & Schwab

(57) ABSTRACT

The tracking and monitoring system for opencast mines of the present invention enables continuously tracking and monitoring vehicles and moveable equipment in opencast mines using ZigBee-enabled active RFID devices forming a dynamic wireless network among them and other static and mobile ZigBee devices placed at strategic locations. The present invention provides a tracking and monitoring system for opencast mines comprises in combination of ZigBee-compliant devices (programmable to operate as end devices, routers and coordinators by hardware specific embedded software) and wireless sensor network software having various application modules for opencast mines. Use of the system of the present invention would help in maintaining computerized record and analysing the performance of costly shovels and dumpers deployed in opencast mines. This would help in optimising the placement of dumpers with each shovel depending on the change in working and dumping places. This would also help in maintaining computerise attendance of dumper operators and other personnel working in an opencast mine. This would further help in providing warning to the signal man and dumper operator, while dumper approaching close proximity to the signal man. This would help in establishing two-way message communication among the personnel engaged in an opencast mine. This would ultimately help in improving production, productivity and safety in opencast mine.

12 Claims, 10 Drawing Sheets

TRACKING AND MONITORING SYSTEM FOR OPENCAST MINES

CROSS REFERENCE TO RELATED APPLICATION

This application claims benefits under 35 U.S.C. §371 international application No. PCT/IN2010/000196, filed on Mar. 29, 2010, which claims priority to Indian application no. 832/DEL/2009, filed Apr. 21, 2009, the contents of which is incorporated by reference in their entirety.

FIELD OF INVENTION

The present invention relates to a tracking and monitoring system for opencast mines. The present invention particularly relates to a tracking and monitoring system for opencast mines which is capable of continuous tracking and monitoring of vehicles and equipment movement in real-time by forming dynamic wireless networking. The present invention more particularly relates to a tracking and monitoring system for opencast mines, which enables continuous monitoring of vehicles and equipment locations, sending messages, and also prevents collision between signal man and dumper in opencast mines.

BACKGROUND OF THE INVENTION AND DESCRIPTION OF PRIOR ART

The tracking and monitoring system for opencast mines of the present invention is a combination of hardware and software, wherein Radio Frequency IDentification (RFID) devices have been provided with a resident hardware specific embedded software for programming the RFID devices to function as coordinator, router and end devices by forming dynamic wireless networking; and an application software, wireless sensor network, for tracking, monitoring and storing of information received from RFID devices placed at strategic locations of an opencast mine. ZigBee-enabled active RFID devices have been used to form a wireless network for the tracking and monitoring system for opencast mines of the present invention.

RFID system is a widely used auto-ID technology today to identify and track objects and people in manufacturing, inventory management, retailing, and security applications. ZigBee is a low-cost, low-power and wireless mesh networking standard. The low cost allows the technology to be widely deployed in wireless control and monitoring applications, the low power-usage allows longer life with smaller batteries, and the mesh networking provides high reliability and larger range.

The ZigBee technology, which is a recently emerged network communication protocol based on the IEEE 802.15.4 standard, provides a self-organized mesh network topology with a power-effective, low data rate and multi-hop data transmission. The RFID system could profit some of its features by introducing the ZigBee technology into the existing RFID architectures, such as having extended effective range, improving network flexibility and having compatibility with other ZigBee enabled environment systems.

The tracking and monitoring system for opencast mines of the present invention is particularly useful for opencast mines. Use of the system of the present invention in opencast mine would help in on-line tracking and monitoring vehicles and moveable equipment using ZigBee-enabled active RFID devices forming a dynamic wireless network among themselves and other static and mobile ZigBee devices placed at strategic locations. This would help in maintaining computerized record and analysing the performance of costly shovels and dumpers deployed in opencast mines. This would help in optimising the placement of dumpers with each, shovel depending on the change in working and dumping places. This would also help in maintaining computerise attendance of dumper operators and other personnel working in an opencast mine. This would further help in providing warning to the signal man and dumper operator, while dumper approaching close proximity to the signal man. This would help in establishing two-way message communication among the personnel engaged in an opencast mine. This would ultimately help in improving production, productivity and safety in opencast mine.

Reference may be made to the Proceeding (572) Communication Systems, Networks, and Applications-2007, titled: ZigBee Enabled Radio Frequency Identification System. http://www.actapress.com/PaperInfo.aspx?PaperID=31796&reason=500

In this paper, a discussion is made about the possible benefits and applications while applying ZigBee to the different parts of the RFID system. An integrated ZigBee RFID system architecture is also discussed and a demo system is described in the paper.

Reference may be made to the paper presented in the ASCE Construction Research Congress: The Global Construction Community, May 6-8, 2007, Grand Bahama Island, titled: Wireless sensor technologies for automated tracking and monitoring of construction materials utilizing ZigBee networks. http://www.pm.umd.edu/e-construction/Resources/Jang%20%20Wireless%20Sensor%20Technologies%20for%20Automated%20T In this paper, a discussion is made about automated material tracking system architecture. To overcome the limitations in previous RFID and GPS-based technologies observed in current construction practices, a new ZigBee-based localization technique with two different types of query and response pulses is presented in the paper for more accurate tracking performance. The system can provide ZigBee-based monitoring capacity by embedding specific transducers into the system for various purposes of monitoring applications. The paper also presents the optimization of router placement and cost benefit analysis to present research direction in the future.

Reference may be made to the paper published in the International Union of Radio Science (URSI) General Assembly, Aug. 9-16, 2008, Chicago, France, titled: Wireless information and safety system for underground mines. http://www.cnfrs.institut-telecom.fr/pages/pages_ursi/URSIGA08/papers/D01p5.pdf In this paper, a discussion is made about a wireless information and safety system for underground mines. The hardware components of the system are ZigBee-compliant active radio frequency identification (RFID) devices/transceivers. The devices can be programmed to act as end device (tag), router or coordinator that enables them to form an IEEE 802.15.4-based mesh network. It uses a unified wireless mesh-networking infrastructure to locate, trace and manage mobile assets and people as well as monitor different environmental conditions using sensor Reference may be made to patent numbers: U.S. Pat. Nos. 6,353,743 and 7,313,401, entitled "Positioning system using packet radio to determine position and, to obtain information relative to a position", wherein a system has been described and claimed for receiving global positioning system (GPS) signals, and receiving and transmitting packet radio signals.

The positioning system receives GPS transmissions to determine its pseudo position. The positioning system also receives differential corrections relative to its pseudo position using packet radio. By combining the GPS transmissions and the differential corrections, the positioning system calculates its actual position.

Reference may be made to patent number: U.S. Pat. No. 7,265,668, entitled "System and method for asset tracking and monitoring", wherein a system and method has been described and claimed for multi-mode asset tracking and monitoring for comprehensive reporting of asset position; status, and alerts. The multi-mode system and method is based on the addition of a local network monitoring system to a wide area satellite network monitoring system.

Reference may be made to patent numbers: U.S. Pat. Nos. 7,196,621 and 7,218,227, entitled "Tracking system and associated method", wherein a system and method has been described and claimed for tracking movable assets. The tracking system includes a monitoring device, a tracking information network, a data communication network, a tracker tag, and a tracking information server. The tracker tag operates independent from the asset and uses GPS technology. The tracking information server provides tracking information and related information to a subscriber.

Reference may be made to patent number: U.S. Pat. No. 7,215,255, entitled "Method and apparatus for a satellite positioning-based metering system for use in transport-related applications", wherein a method and system has been described and claimed for monitoring, measuring, and/or usage metering of a vehicle involving tracking continuous movement and position of the vehicle for priced parking spots, priced roads, and/or pay-as-you-drive insurance. The system comprises a vehicle-mounted apparatus incorporating positioning signal reception, filtering, compression, storage and wireless transmission, while a central processing system collects these position-logs for matching with digital maps and parking, road use, and insurance fee application schedules.

Reference may be made to patent number: U.S. Pat. No. 7,212,829, entitled "Method and system for providing shipment tracking and notifications", Wherein a method and system has been described and claimed for monitoring status of articles being shipped. The monitoring can produce notifications to interested parties. The notifications typically contain status information pertaining to the articles being shipped. Alternatively, interested parties can gain access to status information pertaining to the articles being shipped via a website.

Reference may be made to patent number: U.S. Pat. No. 7,187,278, entitled "Rule based proximity and time based tracking system", wherein a method and system has been described and claimed for automatically tracking, monitoring and scheduling the shipping of objects through carriers such as delivery trucks, ships, or planes is disclosed. A tracking tag is attached to each shipped object. The tracking tag and transportation system uses such techniques as GPS, cellular technology, and bar coding, and sensors such as those that make temperature, pressure, and noise measurements as sources of tracking information.

Reference may be made to patent number: U.S. Pat. No. 7,047,114, entitled "System and apparatus for automatic and continuous monitoring, proactive warning and control of one or more independently operated vessels", wherein a system has been described and claimed for automatic continuous real-time monitoring, tracking, navigation and proactive warning for one or more private and commercial marine vessels and for automatically controlling their navigation within a specific region. The system and apparatus employs intelligent display, GPS, and transceiver/modem devices on marine vessels that are underway, anchored or docked to routinely transmit the vessels ID, GPS and status data to a supervisory fail-safe computer server. The server's resident relational database contains both pre-entered static information about all vessels having similar on-board devices, as well as dynamic information (such as coordinate data relating to rough seas, severe weather, GPS data for all participating vessels, underwater hazards, fog, etc.).

Reference may be made to patent number: U.S. Pat. No. 7,046,193, entitled "Software GPS based integrated navigation", wherein a system has been described and claimed for acquiring GPS data from at least one GPS satellite for tracking. A code offset and a frequency offset are determined based on the acquired GPS data. A change in GPS position of the GPS receiver during the determination of the code offset is determined, and a change in rate of the GPS receiver during the determination of the frequency offset is also determined. The code offset is updated based on the change in GPS position, and the frequency offset is updated based on the change in rate. The updated code offset and the updated frequency offset are handed over to a tracking function.

Reference may be made to patent number: U.S. Pat. No. 6,933,884, entitled "System for tracking and monitoring vessels", wherein a system has been described and claimed for remotely tracking, monitoring and messaging vessels utilizing a global positioning system satellite constellation, having a transceiver located on the vessel to be tracked and monitored, a monitoring center located remote from the vessel, a communications means allowing the bi-directional communication between the transceiver and the monitoring center, a communications means allowing the uni-directional communication from the global positioning system satellite constellation to the transceiver, sensors on the on-board systems of the vessel, a communications means allowing communication between the sensors and the transceiver, an input/output means for messaging, and a communications means allowing communication between the input/output means and the transceiver.

Reference may be made to patent number: U.S. Pat. No. 6,501,393, entitled "System and method for using impulse radio technology to track and monitor vehicles", wherein a system and method has been described and claimed for tracking vehicles. A system, electronic monitor and method are provided that utilize the communication capabilities and positioning capabilities of impulse radio technology to enable people (e.g., mechanics, fans, broadcasters, drivers) to track a position of a vehicle as it moves around a race track and/or to enable people to monitor an engine, transmission system, braking system and other vehicular parameters of the moving vehicle.

Reference may be made to patent number: U.S. Pat. No. 6,519,529, entitled "Intermodal movement status monitoring system", wherein a system has been described and claimed for tracking and monitoring the intermodal status of cargo trailers. In addition to the information provided by a GPS unit, the system monitors the status of various sensors on the trailer. The GPS unit provides the location and velocity of a trailer. A wheel monitoring unit provides the status of the wheels of the trailer, specifically whether there is rotation of the wheels or not. Anti-lock braking systems are used to provide signal information indicative of the wheel rotation status. An independent wheel rotation sensor is also used to provide the wheel rotation status. A computer processor determines the intermodal movement status of the trailer using the wheel rotation status and the location and velocity information.

Reference may be made to patent numbers: AU2000235013B and U.S. Pat. No. 6,100,806, entitled "Apparatus and method for continuous electronic monitoring and tracking of individuals", wherein a system and method has been described and claimed for monitoring mobile objects or persons utilizes the GPS satellites and cellular telephone communications. The apparatus may include first and second remote units adapted to be worn on the monitored person or object. These remote units would comprise the position and data sensors as well as the transmitter device to transmit the information back to a central tracking station. The remote units may be operative to monitor many data items such as system integrity, motion, temperature, audio, and the like in addition to position. This data would then be transmitted back to a central monitoring station operative to process and display the information. The system is also adapted to monitor persons in hazardous environments such as radioactivity or poisonous gases or even to monitor inanimate objects such as automobiles.

Reference may be made to patent number: U.S. Pat. No. 5,519,403, entitled "Global positioning system communications multi-interface", wherein a system has been described and claimed for generating position information, a processor coupled to the GPS receiver by a bus, and a communications multi-interface coupled to both the GPS receiver and to the processor by the bus. The processor presents the position information to the communications multi-interface capable of interfacing with a wide variety of communications systems. Applications of the system include guided weapons systems, interrogatable tag systems, collision avoidance systems, remote locator/responder systems, beacon location systems, search and rescue transceiver systems, location reporting pager systems, and cellular telephone location systems.

Reference may be made to patent number: US2008088438, entitled "System and method of tracking the movement of individuals and assets", wherein a system and method has been described and claimed for tracking the movement of individuals and assets. A monitoring system is provided, by which location data and possibly other information from a wireless personal tracking device carried by an individual is transmitted to an administrative hub for processing and action according to defined rules.

Reference may be made to patent number: EP1909245, entitled "Wireless mobile vehicle real-time tracking and notification systems and methods related thereto", wherein a system has been described and claimed for notifying passengers of an approaching vehicle. Utilizing such a system and methods, passengers can remain in a safe, controlled environment, avoiding harsh environmental conditions and excessive waiting times, instead arriving at their pick-up point closer and prior to a vehicle's arrival. More specifically, the present invention relates to a bus notification system wherein passengers are able to know the location and estimated arrival time of the bus several minutes before its arrival at a specified location along the bus route. The present invention also features a system and methods for locating an in-transit vehicle and for providing real-time mapping and monitoring of such in-transit vehicles.

Reference may be made to patent number: TW319870Y, entitled "Portable multi-functional monitoring and tracking system for vehicle", wherein a system has been described and claimed for multi-functional monitoring and tracking system for vehicle.

Reference may be made to patent numbers: CA2608727 and US2008042805, entitled "System and method for detecting, monitoring, tracking and identifying explosive materials", wherein a system and method has been described and claimed for detecting, monitoring, tracking and identifying explosive materials. This invention relates to a system and method for monitoring, detecting, tracking and identifying explosive materials. The system and method involves tracking and monitoring the explosive material during every part of the chain of custody.

Reference may be made to patent number: US2008030322, entitled "GPS tool and equipment tracking system", wherein a system has been described and claimed for tracking of equipment. The system is an invention that will allow owners of tools and equipment to track location of their inventories and reduce the likelihood of their thief and allow better control of inventories.

Reference may be made to patent number: US2008018458, entitled "Remote tracking system with a dedicated monitoring center", wherein a system has been described and claimed for tracking of vehicle. A system includes one or more remote tracking devices, where each remote tracking device including a cellular transceiver, a positioning system receiver, and a processor connected to the positioning system receiver and the cellular transceiver. A dedicated monitoring center is in communication with each of the remote tracking devices and includes a monitoring center application to process and store the location information and status information received from each of the at least one remote tracking device.

Reference may be made to patent number: WO2008011265, entitled "Apparatus and method for locating individuals and objects using tracking devices", wherein a system and method has been described and claimed for monitoring objects and individuals. In this system, a monitoring station is remotely accessible through a user interface. The interface is adapted to provide a visually cognizable rendering of an area and a tool useful for selecting at least a portion of said area, and to communicate a first request signal to provide location coordinates of a first tracking device.

Reference may be made to patent number: WO2007109838, entitled "An asset monitoring and location system", wherein a system has been described and claimed for asset monitoring and tracking. The system includes at least one GPS satellite, at least one system satellite, at least one remote terminal unit (RTU) adapted to communicate with the at least one global positioning system satellite and the at least one system satellite, a data collection and distribution network including at least one earth station adapted for communication with the at least one system satellite, and at least one user access device to access the data collection and distribution network to provide asset location information.

Reference may be made to patent number: US2007210905, entitled "System and method for satellite aided truck/trailer tracking and monitoring", wherein a system and method has been described and claimed for satellite aided vehicle monitoring. Tire pressure, mileage, and tachometer/speedometer information are generated by sensors that are affixed to different parts of a truck/trailer. Measurement data taken by the sensors is reported to a mobile terminal affixed to the vehicle. In one embodiment, the sensor data is transmitted to the mobile terminal using wireless communication. The mobile terminal transmits reports, which can include sensor information and position information, to a remote location via a communications satellite.

Reference may be made to patent number: US2007213887, entitled "Wireless locating and monitoring system", wherein a system has been described and claimed for determining a location of the device and a processor connected to the positioning system. The wireless tracking device further including a wireless radio connected to the processor for transmitting the location of the device across a wireless area network. A vehicle monitoring system including a sensor, a microcontroller configured to receive a sensor input from the sensor and determine a vehicle condition data, and a wireless transmitter in communication with the microcontroller. The wireless transmitter is configured to transmit the vehicle condition data to a remote data network access point Reference may be made to patent number: US2007171045, entitled "A personal locator system", wherein a system has been described and claimed for locating, tracking, and messaging between people, which preferably includes a satellite, global positioning satellites, ground monitoring units, and a portable-transmitter-receiver unit to locate and track objects and people. A communications satellite system can transmit and receive messages concerning the location and situation of an object or person. A location system may operate by way of global positioning satellites. The portable transmitter-receiver can activate a signal to the satellite system, which can inform the ground monitoring units that a person is in need of help. Each transmitter-receiver can contain memory that allows for identification of the wearer and can provide information such as address, medical problems, emergency contacts, etc.

Reference may be made to patent number: GB2432079, entitled "A position tracking system", wherein a system has been described and claimed for tracking of position. The system comprises a primary unit that transmits a position signal derived from e.g. GPS, and two or more monitoring units that receive and retransmit the position signal. The primary unit is attached to an object to be tracked and comprises a GPS receiver and a transmitter to broadcast its position to an in-range monitoring unit.

Reference may be made to patent number: JP2007072597, entitled "Vehicle tracking system", wherein a system has been described and claimed for precisely determining whether or not a vehicle is a stolen one, and quickly and precisely providing initial response when a vehicle is stolen. The system includes a signal transmitting device mounted on a vehicle for transmitting signals to a monitoring center, and a monitoring device installed in the monitoring center for monitoring vehicles. The signal transmitting device transmits an identification signal and a vehicle position information signal, the identification signal being a signal capable of identifying at least one of the vehicle, the vehicle's owner, or the signal transmitting device mounted on the vehicle. The monitoring device has a receiving means for receiving the signals transmitted from the signal transmitting device; a theft report data storage part that previously stores vehicle theft report information; and a theft determining part for obtaining the theft report information from the theft report data storage part according to the identification signal received from the signal transmitting device and determining whether or not the vehicle is a stolen one. When the vehicle is a stolen one, the current position of the vehicle stolen is tracked according to the position information signal received from the signal transmitting device.

Reference may be made to patent number: GB2431261, entitled "Route planner", wherein a system has been described and claimed for route planning and traffic monitoring. The system combines the geographical coverage possible with fixed, predefined route segment costs (e.g. the legal speed limit) with, wherever possible, richer time dependent costs. A portable navigation device, can continue route planning as before to virtually any destination in a country covered by the stored map database, but wherever possible, can also use traffic data with time-dependent costs, so that the effect of congestion with any time predictability can be accurately taken into account as an automatic, background process. It leaves the user to simply carry on driving, following the guidance offered by the navigation device, without needing to be concerned about congestion that exists now, and whether it will impact his journey.

The drawbacks of the above said patent numbers: U.S. Pat. Nos. 6,353,743, 7,313,401, 7,265,668, 7,196,621, 7,218,227, 7,215,255, 7,212,829, 7,187,278, 7,047,114, 7,046,193, 6,933,884, 6,501,393, 6,519,529, AU2000235013B, U.S. Pat. Nos. 6,100,806, 5,519,403, US2008088438, EP1909245, TW319870Y, CA2608727, US2008042805, US2008030322, US2008018458, WO2008011265, WO2007109838, US2007210905, US2007213887, US2007171045, GB2432079, JP2007072597 and GB2431261 are that the systems are based on GPS technology and costly. Moreover, they are not specifically developed for opencast mines application. Even application software of the developed technologies are also different from the required purpose of opencast mines for optimizing shovel-dumper performance.

Reference may be made to patent numbers: U.S. Pat. Nos. 7,336,178 and 7,339,478, entitled "Method and apparatus for remote control vehicle identification", wherein an method and apparatus has been described and claimed for automatically tracking each individual vehicle, of a plurality of vehicles, in a race around a track. The device employs radio frequency identification (RFID) tags on each of the vehicles being tracked. The device employs RFID tags and a gate to energize the tag to broadcast the vehicle's identity when a pass through the gate is determined.

The drawbacks of the above said patent numbers: U.S. Pat. Nos. 7,336,178 and 7,339,478 are that the systems are especially designed for vehicle identification at gate. These technologies can not be used in surface mines application where continuous monitoring is required throughout the mine.

Reference may be made to patent number: U.S. Pat. No. 7,123,149, entitled "Tagging and tracking system for assets and personnel of a commercial enterprise", wherein a system has been described and claimed for tracking assets (tools and materials) and personnel associated with a work site. Personnel are equipped with tracking devices having at least geo-location capability. Assets are tagged with RFID tags, which are interrogated at portals, by mobile scanners, or by personnel tracking devices having RFID reading capability. The tag readers and tracking devices are all in communication with a common information backbone and all data is delivered to, and processed by, a common command and control subsystem.

The drawbacks of the above said patent number: U.S. Pat. No. 7,123,149 are that the systems are especially designed for tracking of assets and personnel of a commercial enterprise. The system can not used for opencast mining application.

Reference may be made to patent number: CN1953408, entitled "A method to realize real-time monitoring of the underground coal miners by ZigBee network", wherein a system has been described and claimed for real-time monitoring of underground miners using a ZigBee network.

Reference may be made to patent number: KR100612700B, entitled "System and method for providing underground facility information using RFID", wherein a system has been described and claimed for providing information facility for underground using RFID tags.

Reference may be made to patent number: CN2871852Y, entitled "Mine comprehensive information system under well based on ZigBee technology wireless network", wherein a system has been described and claimed for wireless communication in mine. The system is proposed for monitoring miner's location.

The drawbacks of the above said patent numbers: CN1953408, KR100612700B and CN2871852Y are that the systems are especially developed for underground application. The application software of the developed systems are different from the required purpose of optimum performance of shovel-dumper combination in opencast mines.

Reference may be made to patent number: 0777DEL2008, entitled "Wireless information and safety system for mines", wherein a system has been described and claimed for wireless tracking and communication in mine.

The drawbacks of the above said patent numbers: 0777DEL2008, are that the wireless network of the system is not dynamic. It is a static wireless network. To make the system work in case of failure of certain routers, some redundant routers have to be placed along with the routers normally placed in mines at strategic locations. Message facility provided by the system is based on pre-coded message facility. Users can not send the required message as and when required except the pre-coded messages. Further, the application software is not opencast specific where optimisation of shovel-dumper performance can not be performed efficiently. Further, wireless sensor networking in said patent is based on first-come-first serve basis i.e. queue based algorithm. Said algorithm has several drawbacks such as (i) flooding of data, (ii) missing of data, and (iii) inefficient router placing etc. Further, in said patent, RFID unit radio and microcontroller are not used on a single chip, thereby resulting in a larger size device and higher power consumption. Moreover, printed antenna on PCB is used which has less gain, thereby having less communication range. Additionally, the embedded software of said wireless sensor networking system does not incorporate power saving algorithm for reducing power consumption by end devices.

Reference may be made to the paper published in J SCI IND RES VOL. 68 February 2009, titled as: "Wireless information and safety system for mines". The paper discloses a wireless information and safety system for mines for tracking of mines and moveable equipment. One drawback of the system is that RFID unit radio and microcontroller are not used on a single chip, thereby resulting in a larger size device and higher power consumption. Moreover, printed antenna on PCB is used which has less gain, thereby having less communication range. Another drawback of system is that the wireless networking is static, which causes redundancy problem in large wireless sensor networking. Once, one router failed, subsequent network also get failed. Further, in said system, there is no provision for text messaging. Only 4 pre-coded messages are possible using four switches. Further, the embedded software of wireless sensor networking system does not incorporate power saving algorithm for reducing power consumption in end devices. Additionally, in the wireless networking software, only monitoring of dumper is possible, there is no provision of automatically performing optimal shovel-dumpers performance at different loading points and graphically displaying the results.

From the above referred hitherto known prior art systems and drawbacks thereof, it is clear that there is a definite need to provide a low-powered tracking and monitoring system for continuous locating of vehicles and equipment, optimum performance of shovel-dumper combination, collision prevention and two-way message communication.

OBJECT OF THE INVENTION

The main objective of the present invention is to provide a tracking and monitoring system for opencast mines, which obviates the drawbacks of the hitherto known prior art as detailed herein above.

Another objective of the present invention is to track and monitor vehicles and equipment in underground mine using ZigBee-enabled active RFID devices forming a dynamic wireless network among themselves and other static and mobile ZigBee devices placed at strategic locations, which obviates the drawbacks of the hitherto known prior art as detailed above.

Still another objective of the present invention is to maintain computerized record and analyze the performance of costly shovels and dumpers deployed in opencast mines.

Yet another objective of the present invention is to optimize the placement of dumpers with each shovel depending on the change in working and dumping places.

Still yet another objective of the present invention is to maintain computerise attendance of dumper operators and other personnel working in an opencast mine.

A further objective of the present invention is to provide warning to the signal man and dumper operator, while dumper approaching close proximity to the signal man.

A still further objective of the present invention is to establish two-way message communication among the personnel engaged in an opencast mine.

A yet further objective of the present invention is to improve production, productivity and safety in opencast mine.

A yet further objective of the present invention is to enable power-saving facility in the end devices.

A yet further objective of the present invention is to automatically perform optimal shovel-dumpers performance at different loading points and graphically displaying the results.

SUMMARY OF THE INVENTION

Accordingly the present invention provides a tracking and monitoring system for opencast mines comprising a combination of a plurality of programmable active RFID transceiver devices in communication with a microprocessor based computing and storage device, said RFID transceiver devices are programmable to operate as coordinators, routers and end devices, having resident hardware specific embedded software, capable of forming a wireless network among themselves such that a plurality of said RFID transceiver devices programmed as routers are strategically placed to form an unified wireless mesh-networking infrastructure wherein a router is capable of transmitting and receiving signals from one or more routers, RFID transceiver devices programmed as end devices and RFID transceiver devices programmed as coordinator, the said coordinator capable of receiving and transmitting signals to said routers and said computing and storage device wherein said computing and storage device is provided with resident wireless sensor network application software for tracking, monitoring and storing of information received via coordinator characterized in that the programmable active RFID transceiver devices consists of an external caplamp battery (CB), light emitting diode (L1), voltage regulator (VR), turnover switch (TS), internal battery supply (BS), safety arrangement (SA), embedded radio (ER), programming port (PR), universal asynchronous receiver-transmitter output (UO), analog to digital converter (AI), buzzer (BU), message switch (MS), and light emitting diode (L2);

wherein the external caplamp battery (CB) being connected to light emitting diode (L1) and voltage regulator (VR); the said voltage regulator (VR) being connected to turnover switch (TS); the said turnover switch (TS) being connected to internal battery supply (BS) and safety arrangement (SA); the said safety arrangement (SA) being connected to programming port (PR) and embedded radio (ER); and the said embedded radio (ER) being separately connected to programming port (PR), universal asynchronous receiver-transmitter output (UO), analog to digital converter input (AI), buzzer (BU), message switch (MS), and light emitting diode (L2).

In an embodiment of the present invention, the programmable active RFID transceiver device used is a Zigbee-compliant device.

In another embodiment of the present invention, the message transmitter is connected to the RFID transceiver devices by RS232 serial port for sending key-pad typed messages from any end device/router/coordinator to a particular end device or coordinator, having microcontroller programming unit, consists of a key pad switches (KS), microcontroller (MC), LCD display (LD), latch (LA), UART interfacing IC (UT), and RS232 serial output port (RS); wherein the key pad switches (KS) being connected to microcontroller (MC); the said microcontroller (MC) being separately connected to LCD display (LD), latch (LA) and UART interfacing IC (UT); the said latch (LA) and LCD display (LD) being connected with each other; and the said UART interfacing IC (UT) being connected to RS232 serial output port (RS).

In still another embodiment of the present invention, the ZigBee-compliant active RFID transceiver devices provided with resident hardware specific embedded software to act as coordinator, router and end device forms an IEEE 802.15.4-based mesh network for tracking of vehicles and equipment by wireless sensor networking in opencast mines.

In yet another embodiment of the present invention, the resident wireless sensor network application software, such as herein described, is provided with the following modules: (i) tracking of vehicles and equipment, (ii) performance analysis of shovel-dumper combination, (iii) optimum placement of shovels, (iv) computerised attendance, (v) collision prevention and sending alert message, and (vi) two-way message communication.

In still yet another embodiment of the Present invention, the resident hardware specific embedded software for programming the RFID transceiver devices to function as coordinator, router and end devices, is compiled and debugged in an IAR Embedded Workbench and TI-MAC Library using 'C' language.

In a further embodiment of the present invention, the tracking and monitoring system is capable of automatically forming dynamic network among the routers in case of failure of certain routers in different locations so that communication does not get disturbed in the whole mine.

In a further embodiment of the present invention, the tracking and monitoring system is a low-powered, easy to install and cost-effective system for opencast mines.

Accordingly, the present invention provides a method of tracking and monitoring vehicles and equipment in opencast mines. The method comprises programming a plurality of ZigBee-enabled Active RFID devices to operate as coordinator, routers and end devices, assigning end devices to one or more vehicles, personnels and equipments of an opencast mine, placing programmed routers at various locations of the opencast mine, characterized in that routers are configured to automatically form dynamic wireless mesh network among themselves, co-ordinator and end devices positioned at one or more locations of the mine; and receiving information from one or more routers by a co-ordinator, the co-ordinator being configured to send the information to a server, wherein the server is configured to track vehicles and equipment in the opencast mine, establish two-way message communication among the end devices, wherein the two-way message communication is facilitated by setting Universal Asynchronous Receiver/Transmitter (UART) buffer of end devices, automatically perform optimal shovel-dumpers performance at one or more loading points and graphically display results, perform optimum placement of shovels, maintain computerized attendance of personnel Working in the opencast mines; and prevent collisions and sending alert signals.

In an embodiment of the present invention, the programming the plurality of ZigBee-enabled Active RFID devices comprises assigning id and addresses to a plurality of RFID devices for defining one or more coordinator, router and end device, declaring associated devices of each RFID device, incorporating power saving algorithm in the end devices, adjusting timer and range for transmission of signals for each RFID device; and compiling and debugging program to the RFID devices in an IAR Embedded Workbench and TI-MAC Library using 'C' language for making the RFID devices ready.

DETAILED DESCRIPTION OF THE INVENTION

Figure 1:
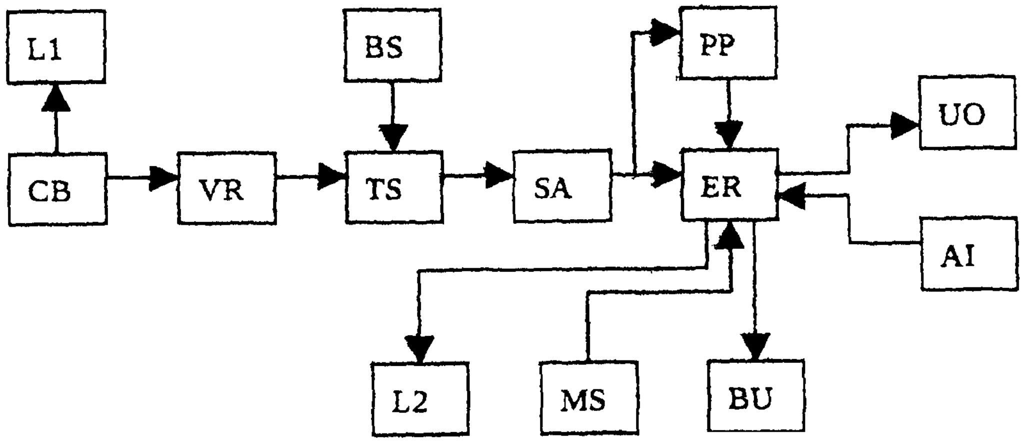
FIG. 1 of the drawings shows the block diagram of ZigBee transceiver which are programmed to work as end device, router and coordinator and to form wireless sensor network in an opencast mine. The ZigBee transceiver consists of various sub-systems for receiving and transmitting 2.4 GHz RF signal through the wireless sensor network in opencast mine.

The tracking and monitoring system for opencast mines of the present invention tracks and monitors vehicle and equipment, optimizes performance of shovel-dumper combination, prevents collision between signal man and dumper, and establishes two-way message communication. The tracking and monitoring system for opencast mines of the present invention is a combination of hardware and software, wherein ZigBee-enabled active RFID devices have been used to form a dynamic wireless network. The RFID devices have been provided with resident hardware specific embedded software for programming the RFID devices to function as coordinator, router and end device. The software is compiled and debugged in the IAR Embedded Workbench and TI-MAC Library using 'C' language. IAR Systems is a Swedish computer technology company working in the area of embedded system development tools; whereas TI (Texas Instruments) is an American company in the area of electronic devices and chips.

The system of the present invention essentially consists of two modules, hardware devices and wireless sensor network embedded application specific software.

The hardware module is ZigBee-compliant active RFID transceiver devices provided with resident application specific embedded software to act as end device (tag), router or coordinator. The devices programmed to act as end device, router or coordinator enables them to form an IEEE 802.15.4-based mesh network. It uses a unified wireless mesh-networking infrastructure to locate, trace and manage mobile assets and people as well as monitor different environmental conditions using sensors. The ZigBee devices have numerous features, namely, unlicensed 2.4 GHz industrial, scientific and medical (ISM) band, ultra low power (ideal for battery operated system), operates for years on inexpensive batteries, large number of nodes/sensors, reliable and secure links between network nodes, easy deployment and configuration, low cost system, very fast transition time, digital battery monitor facility, smaller in size (system on chip), and capable of automatically forming alternative network among the undisturbed and reachable routers in case of disaster.

The resident application software module is a wireless sensor network software which is developed for tracking, monitoring and storing of information received from RFID devices placed at strategic location of a mine. The software is specially designed for different purposes in opencast mines and has following modules: (i) tracking of vehicles and equipment, (ii) performance analysis of shovel-dumper combination, (iii) optimum placement of shovels, (iv) computerised attendance, (v) collision prevention and sending alert signal, and (vi) two-way message communication.

The system of the present invention is a combination of hardware and software modules, wherein hardware devices consisting of ZigBee-compliant active RFID transceiver devices are provided with resident hardware specific embedded software for programming the RFID devices to function as coordinator, router and end devices; and an application software, wireless sensor network, for tracking, monitoring and storing of information received from RFID devices placed at strategic locations of an opencast mine.

The block diagram of ZigBee transceiver of the tracking and monitoring system for opencast mines of the present invention is depicted in FIG. 1, which consists of external caplamp battery (CB), light emitting diode (L1), voltage regulator (VR), turnover switch (TS), internal battery supply (BS), safety arrangement (SA), embedded radio (ER), programming port (PR), universal asynchronous receiver-transmitter output (UO), analog to digital converter (AI), buzzer (BU), message switch (MS), and light emitting diode (L2). The external caplamp battery (CB) is connected to light emitting diode (L1) and voltage regulator (VR). The said voltage regulator (VR) is connected to turnover switch (TS). The said turnover switch (TS) is connected to internal battery supply (BS) and safety arrangement (SA). The said safety arrangement (SA) is connected to programming port (PR) and embedded radio (ER). The said embedded radio (ER) is connected to programming port (PR), universal asynchronous receiver-transmitter output (UO), analog to digital converter input (AI), buzzer (BU), message switch (MS), and light emitting diode (L2). The Zigbee transceiver further comprises a dielectric rod antenna, having better gain, leading to a better communication range of the RFID device.

Figure 2:
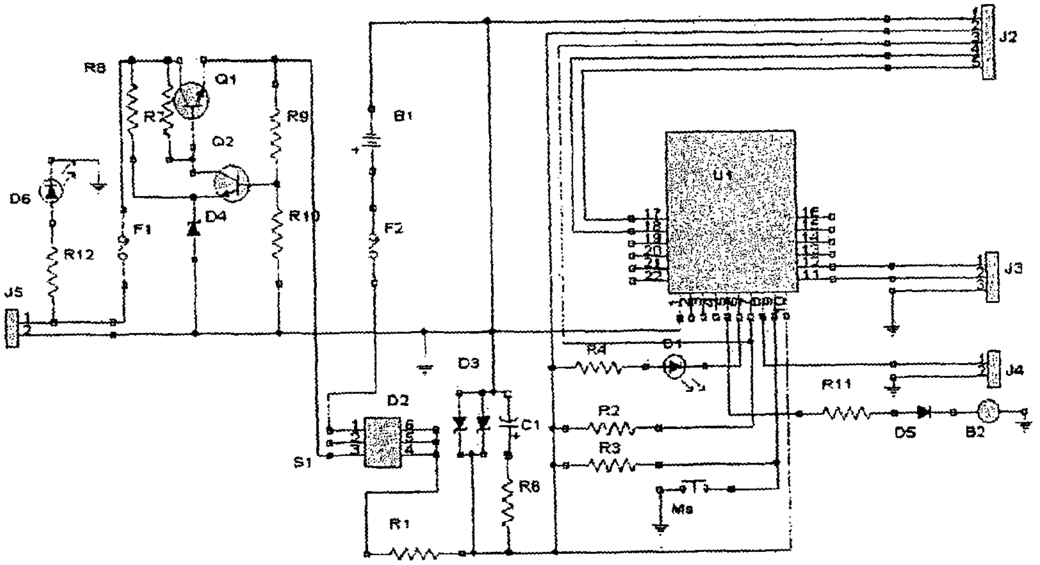
FIG. 2 of the drawings shows the circuit diagram of ZigBee transceiver which is alternately connected with cap lamp battery (4.2 V) or two AA size batteries (3 V). The radio unit of the circuit is a microcontroller-embedded radio (8051 family) with ISM frequency band of 2.4 GHz-2.4835 GHz for receiving and transmitting RF signal.

FIG. 2 of the drawings shows the circuit diagram of the RFID devices. A two pin jack (J5) is connected with the external caplamp battery and LED (D6) via resistance (R12) and also connected to zener diode (D4) via fuse (F1) and resistance (R8). The jack power is connected to transistor (Q1) whose base is controlled by transistor (Q2). The resistance (R7) is connected with the connector and base Of the said transistor (Q1). The said transistor (Q2) base is connected to resistance (R9) and (R10) in which resistance (R9) is connected to the said transistor (Q1) emitter and resistance (R10) is connected to ground. The out put from the said transistor (Q1) emitter connected to end point of three-stage band switch (S1). The battery (B1) is connected via fuse (F2) to another end-point of the said band switch (S1). The middle point of the said band switch (S1) is open. The out put from all three stages of the said band switch (S1) is common and connected via resistance (R1) to zener diode (D3). The cathode point of the said zener diode (D3) is grounded. The capacitor (C1) is connected via resistance (R6) to anode of the said zener diode (D3), and another end of the said capacitor (C1) is grounded. The embedded radio (ER) is connected to LED (D1) via resistance (R4) and power supply through the said resistance (R1). The resistances (R2 and R3) are connected to power supply via the said resistance (R1) to the said embedded radio (ER). The message switch (Ms) is connected to the said embedded radio (ER) and power supply through resistances (R3 and R1) in series. Another point of the said message switch (Ms) is grounded. The buzzer (B2) is connected to the said embedded radio (ER) via resistance (R11) and diode (D5). The programming port (J2) is connected with the said embedded radio (ER) and power supply. The UART output jack (J3) and ADC in jack (J4) are connected with the said embedded radio (ER) and grounded.

Figure 3:
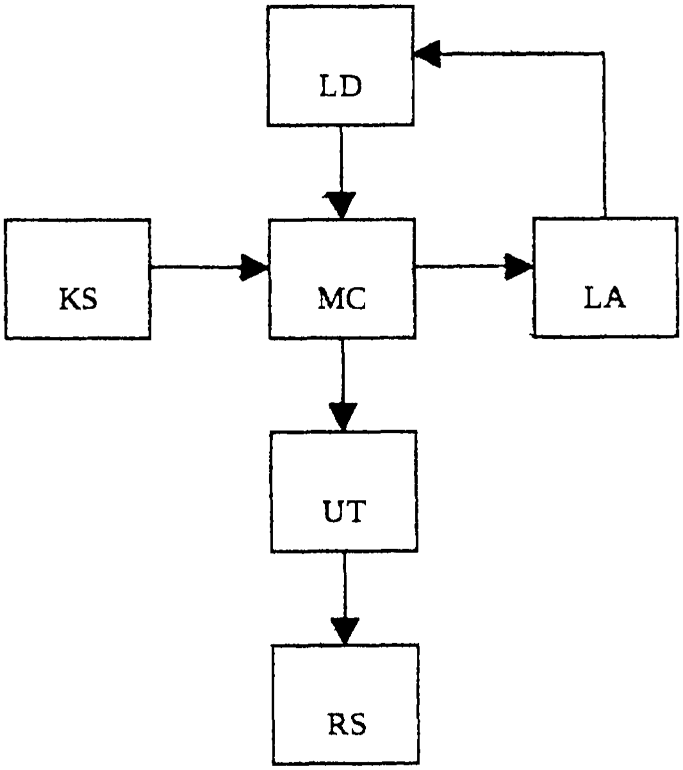
FIG. 3 of the drawings shows the block diagram of message transmitter which is used for sending message from any end device/router/coordinator to a particular end device or coordinator. It is connected to the RFID devices by RS232 serial port.
Figure 4A:
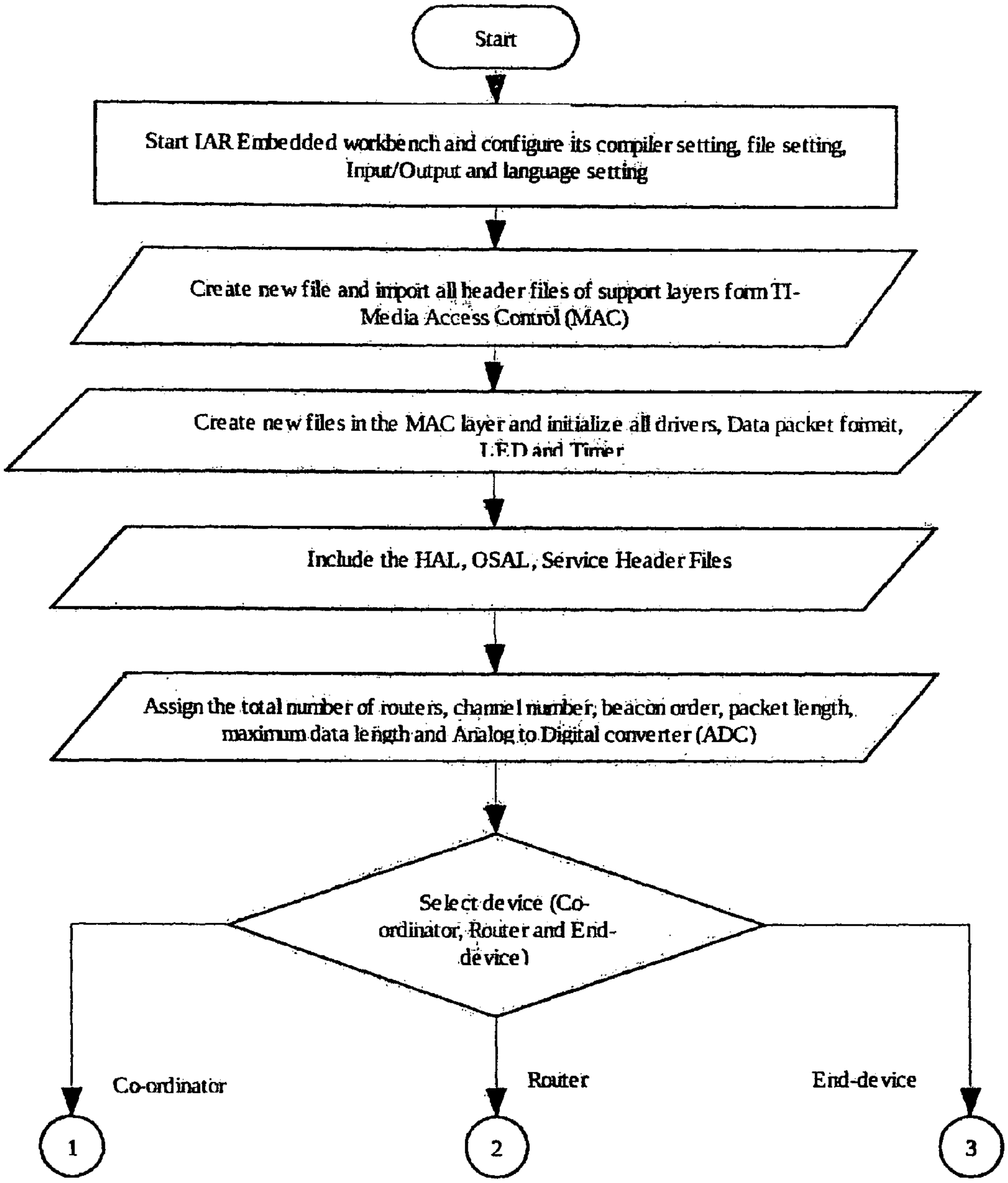
FIGS. 4*a* to 4*d* of the drawings shows the flow diagram of the hardware specific embedded software. The RFID devices have been provided with resident hardware specific embedded software for programming the RFID, devices to function as coordinator, router and end device.
Figure 4B:
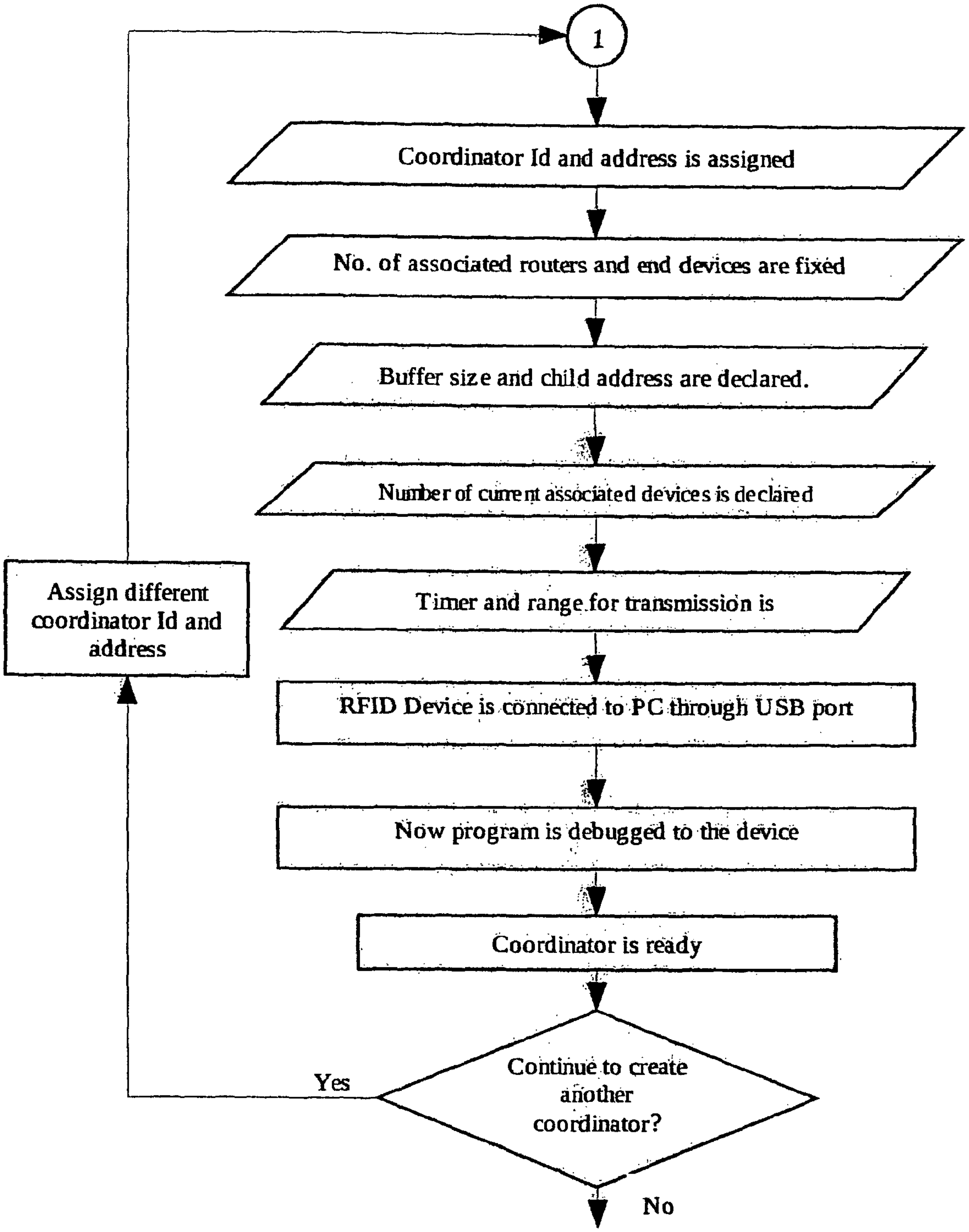
Figure 4C:
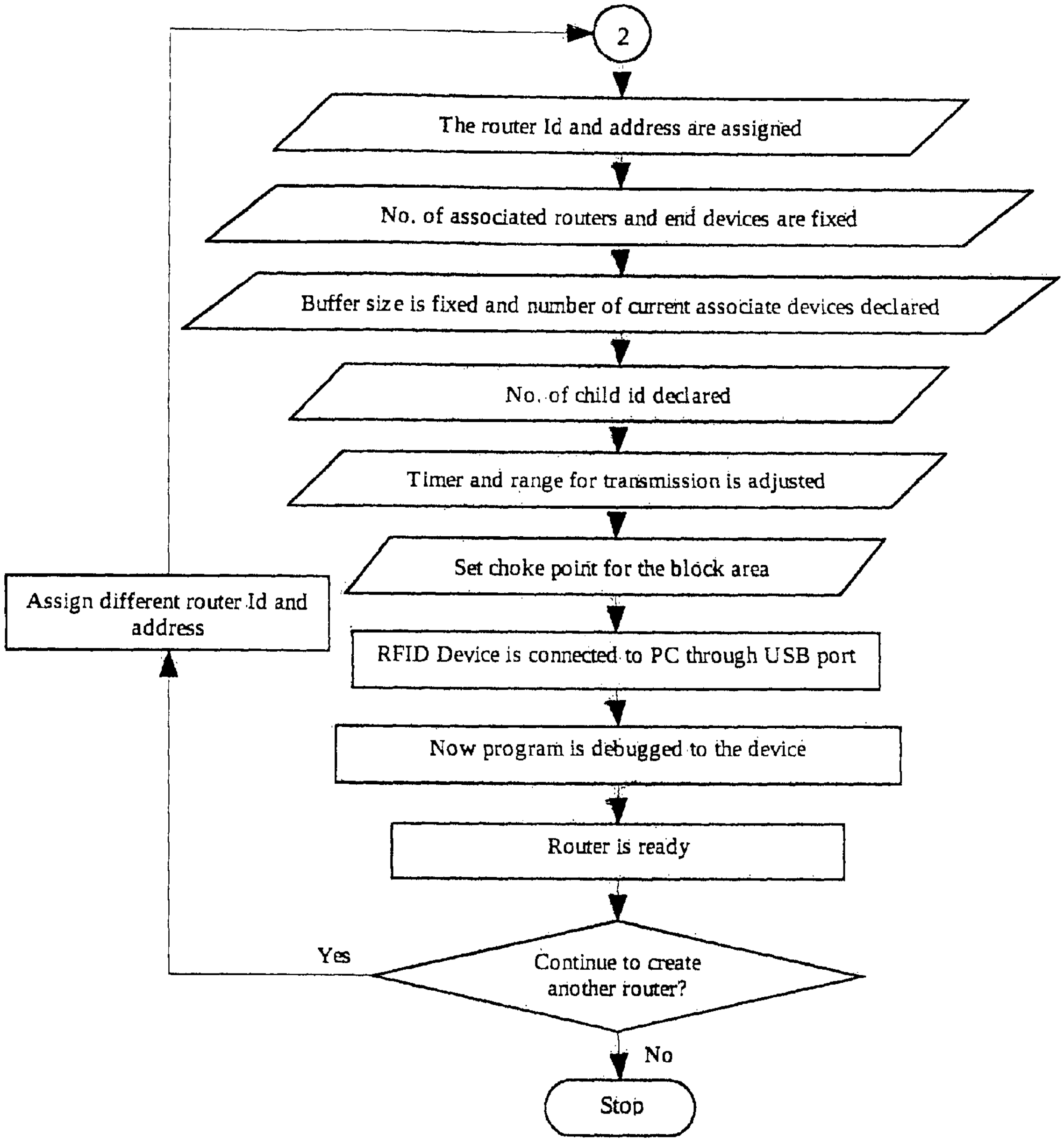
Figure 4D:
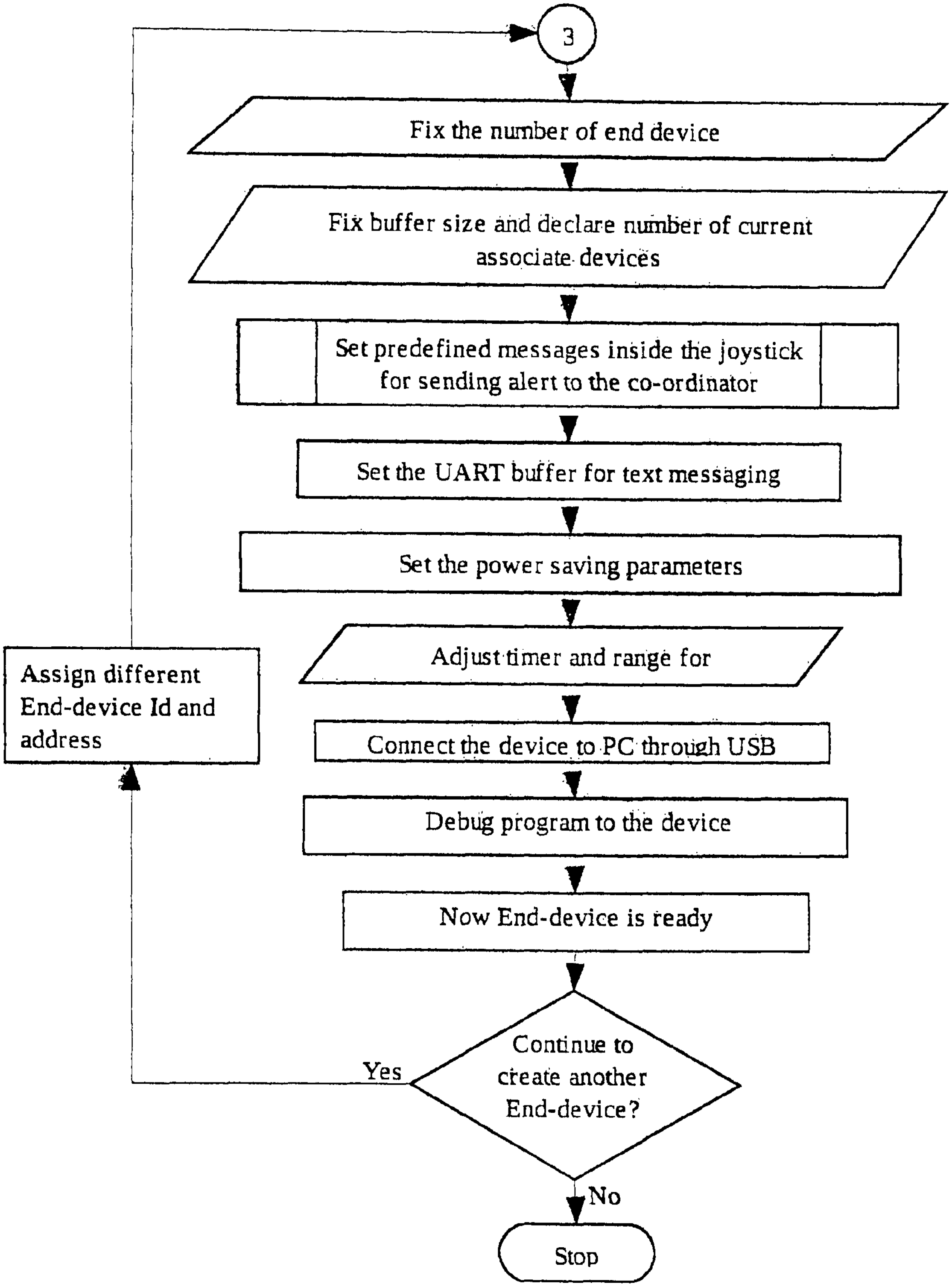

FIG. 3 of the drawings shows the block diagram of message transmitter. The key pad switches (KS) are connected to microcontroller (MC). The said microcontroller (MC) is separately connected to LCD display (LD), latch (LA) and UART interfacing IC (UT). The said latch (LA) and LCD display (LD) are connected with each other. The said UART interfacing IC (UT) is connected to RS232 serial output port (RS).

FIGS. 4*a* to 4*d* of the drawings shows the flow diagram of the hardware specific embedded software, in coordinator, router and end device.

Figure 5:
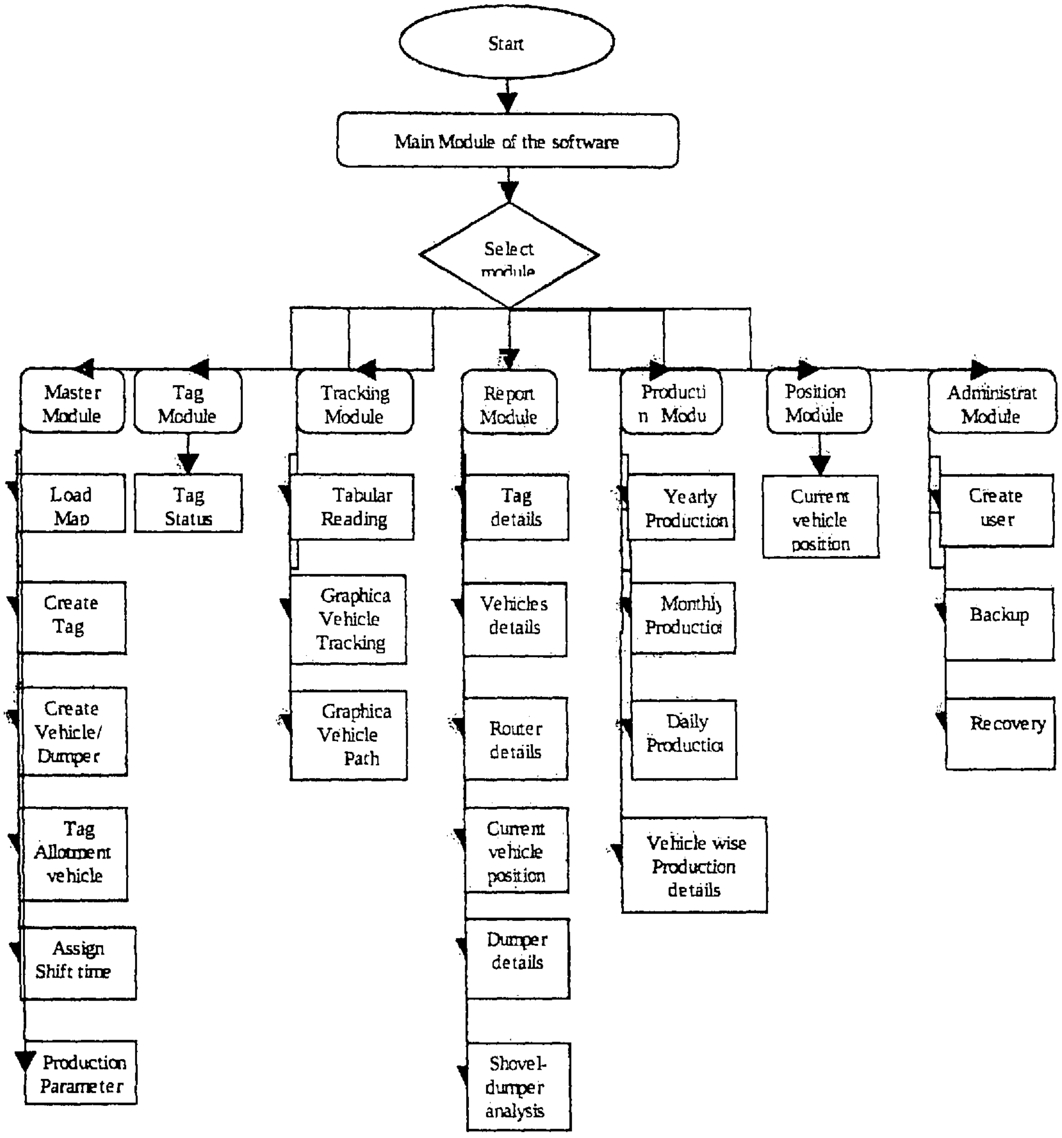
FIG. 5 of the drawings shows the flow diagram of the application software. The wireless sensor network software tracks, monitors and stores information received from RFID devices located in different portions of an opencast mine.

FIG. 5 of the drawings shows the flow diagram of application software, wireless sensor network. The software is used for various purposes in mines and has following modules: (i) tracking of vehicles and equipment, (ii) performance analysis of shovel-dumper combination, (iii) optimum placement of shovels, (iv) computerised attendance, (v) collision prevention and sending alert signal, and (vi) two-way message communication.

Figure 6:
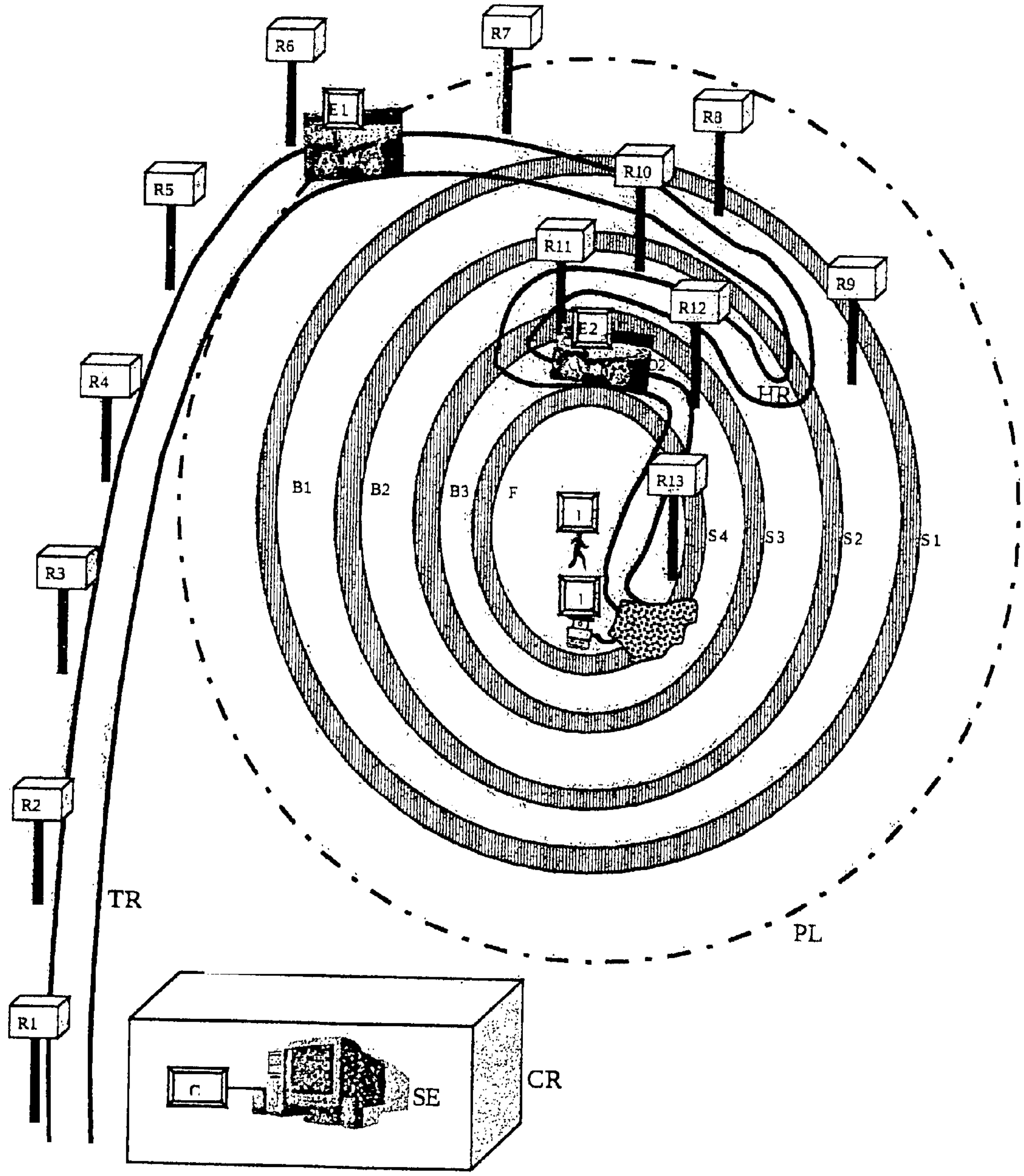
FIG. 6 of the drawings depicts the dynamic wireless network formation in an opencast mine by placing routers at strategic locations along the transport and haul roads.

FIG. 6 depicts the dynamic wireless network formation in an opencast mine by placing routers at strategic locations along the transport and haul roads. The dynamic wireless network is formed using Received Signal Strength Indication (RSSI) based algorithm. In this algorithm, the parent identification is done based on the received signal strength of the surrounding devices, i.e. a device declares its parent to a particular surrounding device from which it is receiving the maximum signal strength and discards other surrounding devices. There are many advantages of such algorithm, such as (i) data flooding prevention, (ii) optimized redundant network formation, (iii) reliable network configuration, (iv) energy efficient network etc.

The wireless sensor network consists of a computer/server (SE), coordinator (C), router (R1 to R13) and end devices (E1 and E4). The computer/server (SE) is connected to the coordinator (C) using RS232 cable in the control room (CR). The routers (R1 to R6) are placed along the transport road (TR) located outside the pit limit (PL) boundary of an opencast mine at an interval of around 80 m distance. The routers (R6 to R13) are placed along the haul road (HR) at an interval of around 60 m, which passes through slopes (S1 to S4) and benches (B1 to B3) of an opencast mine, and reaches up to the open pit floor (F). These routers (R1 to R13) are wirelessly connected with the said coordinator (C). The end devices (E1 and E2) are fitted with the dumpers (D1 and D2) are wirelessly communicated with the said routers (R6 and R11) routers, respectively. The end devices (E3 and E4) are assigned to the signal man and shovel, respectively, these end devices wirelessly communicates with the said router (R13).

Figure 7:
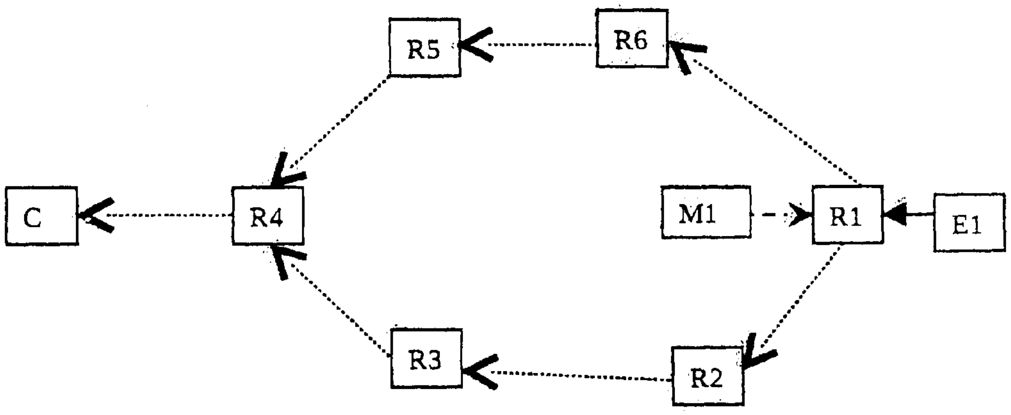
FIG. 7 of the drawings depicts communication between various hardware components of the wireless sensor networking system.

FIG. 7 depicts communication between various hardware components of the wireless sensor networking system. The hardware components of the system includes coordinator (C), routers (R1-R6), an end device (E1) and a message device (M1). Coordinator (C) is kept in a control room and is physically attached to the server using serial port. Coordinator (C) collects all the information from the routers (R1-R6) and sends them to the server for further processing, analyzing, viewing, warning and storing data. Routers (R1-R4) are placed along transportation road for mineral loaded dumpers, whereas routers (R5-R6) are placed along transportation road for empty dumpers. Rotifers (R1-R6) automatically form dynamic wireless mesh network among themselves and other static and mobile ZigBee devices placed at strategic locations. As illustrated in the figure, the end device (E1) is assigned to a particular dumper. In an embodiment of the present invention, the end device (E1) sends information such as its ID number, date and time periodically to its nearest router (R1). Router (R1) receives information from end device (E1) and adds its ID number with the information of end device (E1) and transmits the total information to nearest router (R2). Subsequently, data is transmitted to coordinator (C) via routers (R3 and R4). When a loaded dumper moves along the routers (R1, R2, R3 and R4) and empty dumper passes along routers (R5, R6 and R1), its travel path is recorded with time stamp with respect to each router. From monitored data, the application software of the system calculates following:

1) Travel time taken by the dumper (End device, E1) to cover one cycle (i.e. R1-R2-R3-R4-R5-R6-R1). This facilitates observing the unnecessary delay and taking necessary steps by the mine management.
2) Waiting time at loading point (R1). If waiting time of dumper is more than the loading time of the dumper by shovel, then number of dumpers deployed with a shovel can be reduced for cost effective performance. Similarly, if shovel waits for dumper to load, then number of dumpers can be enhanced.
3) Number of trips in a shift/day/month/year to calculate mineral production. Similarly, quantity of waste generation can also be calculated.

The message device (M1) is used to send text messages from any location in the network. Further, power saving algorithm is incorporated in the end device (E1), so that the device can operate for longer duration without replacing battery. Moreover, the wireless sensor networking is dynamic in nature. If any router (suppose, R2) fails, then the system automatically self configures and communication is established via routers (R1, R6, R5 and R4) or routers (R3, R4) to coordinator (C).

In a feature of the present invention, the tracking and monitoring system is capable of tracking and monitoring vehicles and moveable equipment in opencast mine using ZigBee-enabled active RFID devices forming a dynamic wireless network among themselves and other static and mobile ZigBee devices placed at strategic locations.

In another feature of the present invention, the tracking and monitoring system is capable of maintaining computerized record and analyze the performance of costly shovels and dumpers deployed in opencast mines.

In yet another feature of the present invention, the tracking and monitoring system is capable of optimizing the placement of dumpers with each shovel depending on the change in working and dumping places.

In still another feature of the present invention, the tracking and monitoring system is capable of maintaining computerise attendance of dumper operators and other personnel working in an opencast mine.

In a further feature of the present invention, the tracking and monitoring system is capable of providing warning to the signal man and dumper operator, while dumber approaching close proximity to the signal man.

In a yet further feature of the present invention, the tracking and monitoring system is capable of establishing two-way message communication among the personnel engaged in an opencast mine.

In another feature of the present invention, the tracking and monitoring system is capable of improving production, productivity and safety in opencast mine.

In yet further feature of the present invention, the end devices of tracking and monitoring system can operate for longer duration without replacing battery.

In yet further feature of the present invention, the tracking and monitoring system automatically perform optimal shovel-dumpers performance at different loading points and graphically display the results.

In the present invention there is provided a tracking and monitoring system for opencast mines, which comprises in combination of ZigBee-compliant devices, programmable to operate as end devices, routers and coordinators by hardware specific embedded software, and wireless sensor network application software having various application modules both for opencast mines. The core module, ZigBee-compliant devices (programmable to operate as end devices, routers and coordinator) consists of different sub-systems. The external caplamp battery (CB) is connected with the light emitting diode (L1) to indicate the connection with the external power supply. The said caplamp battery (CB) is also connected with the voltage regulator (VR) to provide the regulated 3.1 V power, supply to the circuit. The internal battery supply (BS) is also connected with the RFID device through turnover stitch (TS) so that the device can be operated using external battery supply (BS) or internal battery supply (BS). The said turnover switch (TS) is connected with safety arrangement (SA) to make the device intrinsically safe. The out put after the said safety arrangement (SA) is feed to programmable port (PP) and embedded radio (ER). The said embedded radio (ER) is connected to programming port (PR), universal asynchronous receiver-transmitter output (UO), analog to digital converter input (AI), buzzer (BU), message switch (MS), and light emitting diode (L2) for programming, sending digital signal to external device, taking analog input from external device, generating alarm, transmitting message and indicating the data transmission operation, respectively. The ZigBee transceivers (RFID devices) programmed to operate as coordinator (C) are connected with the computer/server (SE) by serial port in the control room (CR). The ZigBee transceivers which are programmed to work as routers (R) are placed along the haul road and transport roads at an interval of 50-80 m forming wireless mess network and tracking vehicles and moveable equipment. The ZigBee transceivers which are programmed to function as end devices (E) are attached to the staff, vehicle or moveable equipment. The said routers (R) receives signal form the said end devices (E) and forwarded to the coordinator (C) via multi-hop wireless network and same information is stored in the computer/server (SE). Similarly any message for the particular end devices (E) is also send in the reverse way. Different functions and storing information is done by the wireless sensor network application software. The software has different application modules, namely tracking of vehicles and equipment, performance analysis of shovel-dumper combination, optimum placement of shovels, computerised attendance, collision prevention and sending alert signal, and two-way message communication.

In a physical embodiment of the tracking and monitoring system for opencast mines of the present invention the specification of the different units of the system are given below. ZigBee transceivers as shown in FIG. 2: R1—22Ω, 2 W resistor, R2—43 kΩ, ¼ W resistor, R3—43 kΩ, ¼ W resistor, R4—1 kΩ, ¼ W resistor, R6—72Ω, ½ W resistor, R7—33Ω, ½ W resistor, R8—100Ω, ½ W resistor, R9—1 kΩ, ½ W resistor, R10—1 kΩ, ½ W resistor, R11—47Ω, 1 W resistor, C1—10 μF, 25 V capacitor, D1—1 mA LED, D2—3.3 V, 1 W diode, D3—3.3 V, 1 W zener diode, D4—3.3 V, 1 W zener diode, D5—IN4007 diode, Q1—BC547 transistor, Q2—BC547 transistor, F1—0.2 A fuse, F2—135 mA fuse, B1—2*AA batteries (2×1.5 V), B2—0.7 mH, 3-27 V, 10 mA buzzer, J2—programming port, J3—UART output port, J4—ADC input, J5—4.2 V power socket for external battery, S1—three stage turnover switch, Ms—message switch, U1—8051 family microcontroller-embedded radio with ISM frequency band of 2.4 GHz-2.4835 GHz.

Message transmitter as shown in FIG. 3: key pad switches (KS)—push button type, microcontroller (MC)—AT89C51, LCD display (LD)—5 V supply, 32 character, latch (LA)-74LS138, UART interfacing IC (UT)—RS232, and RS232 serial output port (RS)—RS232.

The wireless sensor network application software is developed in Visual Basic under windows environment as front end tool and SQL-Server as back end support. Visual Basic (VB) is an object oriented based software package, therefore various object provide by VB is used. Few functions and classes are designed in VB to integrate the software. For reporting very powerful and extensive software, Crystal Report is used.

The novel features of the tracking and monitoring system for opencast mines of the present invention have been realized by the non-obvious inventive steps of integrating ZigBee-compliant programmable transceivers to function as end devices, routers and coordinator by hardware specific embedded software and wireless sensor network application software having various applications modules, namely tracking of vehicles and equipment, performance analysis of shovel-dumper combination, optimum placement of shovels, computerised attendance, collision prevention and sending alert signal, and two-way message communication. The ZigBee devices meet the IEEE 802.15.4 standard and have valuable features, which made the technology feasible and applicable in mines, namely, unlicensed 2.4 GHz ISM band, ultra low power consumption, operates for years on inexpensive batteries, allows large number of nodes/sensors, reliable and secure links between network nodes, easy deployment and configuration, low cost system, very fast transition time, digital battery monitor facility, smaller in size (system on chip), and capable of automatically forming alternative network among the routers by dynamic networking.

The novelty of the present invention with respect to the prior art are:

1. Capable of tracking and monitoring vehicles and equipment in opencast mine using ZigBee-enabled Active RFID devices forming a dynamic wireless network among themselves and other static and mobile ZigBee devices placed at strategic locations.
2. Capable of maintaining computerized record and analyze the performance of costly shovels and dumpers deployed in opencast mines.
1. Capable of optimizing the placement of dumpers with each shovel depending on the change in working and dumping places.
1. Capable of maintaining computerize attendance of dumper operators and other personnel working in an opencast mine.
2. Capable of providing warning to the signal man and dumper operator, while dumper approaching close proximity to the signal man.
3. Capable of establishing two-way message communication among the personnel engaged in an opencast mine.
4. Capable of improving production, productivity and safety in opencast mine.
5. Enables a low-powered, easy to install and cost-effective tracking and monitoring system for opencast mines.

The novelty of the tracking and monitoring system for opencast mines has been realized by the non-obvious inventive steps of providing in combination: ZigBee-compliant transceivers (programmable to function as end devices, routers and coordinator by hardware specific embedded software) and wireless sensor network application software having various application modules for opencast mines. The system of the present invention mainly consists of two modules, ZigBee transceivers which receive and transmit data by forming multi-hop wireless sensor network in required portion of the mines and a wireless sensor network application software, which receives, process and stores data and send the necessary command/message to respective network devices.

The invention lies in the combination of hardware and software, wherein the hardware specific embedded software has been developed for programming the RFID devices function as coordinator, router and end devices by forming dynamic wireless network. The embedded software is compiled and debugged in the IAR Embedded Workbench and TI-MAC Library using ‘C’ language. IAR Systems is a Swedish computer technology company working in the area of embedded system development tools, whereas TI (Texas Instrument) is an American company manufactures various electronics devices and chips. The application software, wireless sensor network, has been developed to track, monitor and store information received from RFID devices placed at strategic locations of an opencast mine.

Use of the tracking and monitoring system for opencast Mines of the present invention should be done as follows: ZigBee transceivers/devices (end devices, routers and coordinator) are housed in hard and tough structure to sustain tough mining conditions. The coordinator (C) is connected with the computer (PC) using RS232 cable in the surface control room. The routers (R) are hanged in the pole along haul and transport roads of opencast mine so that it should not obstruct movement of man and machinery. The distance between two routers (R) may vary from 60-80 m depending on the line-of-sight visibility. The routers (R) should be placed in such a way that in case of failure of certain RFID devices in a particular portion of opencast mine, the communication can be established by alternative routes automatically using dynamic wireless network. Following the above guidelines the routers (R) are placed on the strategic locations of an opencast mine where monitoring and tracking of vehicles and moveable equipment are needed. These routers (R) form dynamic wireless mess network with the coordinator (C). The end devices (E) are assigned to the staff, vehicle and moveable equipment. The end devices (E) transmit signal/data to the respective routers (R) during their association with them. The respective routers (R) receives signal/data and transmit to the next routers (R) and subsequently data is transmitted to the coordinator (C) through the intermediate routers by multi-hop transmission mechanism. Finally coordinator (C) sends the data to the computer/server (SE). The same data is processed, analyzed and stored in the computer/server (SE) using wireless sensor network application software. The software controls and commands all operations performed by the total network. The software performs various applications, namely, tracking of vehicles and equipment, performance analysis of shovel-dumper combination, optimum placement of shovels, computerized attendance, collision prevention and sending alert signal, and message communication. The detail installation procedures for an opencast mine are depicted in FIG. 6.

The following examples are given by way of illustration of the tracking and monitoring system for opencast mines of the present invention in actual practice and therefore should not be construed to limit the scope of the present invention.

Example-1

A prototype of the tracking and monitoring system for opencast mines of the present invention was used for experimentation in the laboratory tinder simulated condition. The experiment was conducted using 10 ZigBee-compliant transceivers/devices. Transceivers were programmed to operate as end devices (2 numbers), routers (7 numbers) and coordinator (1 number). The coordinator was connected with a computer using RS232 cable and one router was placed near the coordinator. Then remaining six routers were placed in two branches (corridors of the main office building), three routers in each branch keeping a distance of around 15 m between two routers. End devices were given to two persons and instructed to move in different directions of wireless network. The system was operated for six hours and the end devices movement were recorded in the computer using wireless sensor network software. One of the routers were switched off, however, the total network path worked continuously by forming dynamic wireless network. The system worked provided warning signal when a person having end devices reached closer to another person assigned with end device. The two-way message communication could be established with the end devices and coordinator through out the network. The system provided tracking information of both the persons assigned with the end devices, their movement path, duration of stay in a particular area, current position and total operation time.

Example-2

Another experiment was performed with the prototype of the present invention in the Bagdiggi Opencast Mine of Bharat Coking Coal Limited. The experiment was conducted using ZigBee-enabled active RFID devices (2 end devices, 7 routers and 1 coordinator) forming a wireless network among themselves and other static and mobile ZigBee devices placed at strategic locations of the opencast mine. The coordinator was connected with a laptop using RS232 cable near entrance of the opencast mine. One router was placed near the coordinator at a distance of around 30 m. Then remaining six routers were placed in along the haul and transport roads keeping a distance of around 60 m between two routers, so that line-of-sight is maintained between two routers. End devices were given to a dumper operator and a signal man. The signal man was posted near the working place where shovel were operated. The dumper operator was instructed to drive along the transport and haul roads where the routers were placed. The system was operated for six hours and dumper moved six time from one end to another end of the network. The end devices movement were recorded in the laptop using wireless sensor network software. The system provided warning signal to both the signal man and dumper operator when the dumper reached close proximity of the signal man. The system provided tracking information of end devices, their movement path, duration of stay in a particular area, current position, time taken by the dumper to travel the total distance and detail analysis. The two-way message communication was established among the end devices, and between end devices and co-ordinator. The system was successfully experimented in the opencast mine.

The tracking and monitoring system for opencast mines of the present invention essentially enabled to continuously track and monitor miners and moveable equipment in the opencast mine. The system enabled to maintain computerized record and analyse the performance of costly shovels and dumpers. The system enabled to optimize the placement of dumpers with the shovel. The system enabled to maintain computerize attendance of dumper operators. The system enabled to provide warning to the signal man and dumper operator, while dumper approaching close proximity to the signal man. The system enabled to establish two-way message communication among the personnel engaged in the opencast mine. The system enabled to improve production, productivity and safety in the opencast mine. The system enabled a low-powered, easy to install and cost-effective tracking and monitoring technique for the opencast mine.

Therefore, it is conclusively shown that the novel features enabled by the inventive steps of the tracking and monitoring system for opencast mines of the present invention essentially proved useful for the mine management for enhancing production, productivity and safety.

The main advantages of the present invention are:

1. The system tracks and monitor vehicles and equipment in opencast mine using ZigBee-enabled active RFID devices forming a dynamic wireless network among themselves and other static and mobile ZigBee devices placed at strategic locations.
2. The system maintains computerized record and analyses the performance of costly shovels and dumpers deployed in opencast mines.
3. The system optimizes the placement of dumpers with each shovel depending on the change in working and dumping places.
4. The system maintains computerize attendance of dumper operators and other personnel working in an opencast mine.
5. The system provides warning to the signal man and dumper operator, while dumper approaching close proximity to the signal man.

6. The system establishes two-way message communication among the personnel engaged in an opencast mine.
7. The system improves production, productivity, and safety in opencast mine.
8. The system enables a low-powered, easy to install and cost-effective tracking and monitoring technique for opencast mines.

We claim:

1. A tracking and monitoring system for opencast mines comprising a combination of a plurality of programmable active RFID transceiver devices in communication with a microprocessor based computing and storage device, said plurality of programmable active RFID transceiver devices being programmable to operate as coordinators, routers and end devices and having resident hardware specific embedded software capable of forming a dynamic wireless network among themselves such that a first plurality of said plurality of programmable active RFID transceiver devices are programmed as routers which are strategically placed to form an unified wireless mesh-networking infrastructure, wherein each of the programmed routers is capable of transmitting and receiving signals from one or more other routers, end devices, and one of said plurality of programmable active RFID transceiver devices which is programmed as a coordinator, the coordinator capable of receiving and transmitting signals to said routers and said microprocessor based computing and storage device, wherein said microprocessor based computing and storage device is provided with resident wireless sensor network application software for tracking, monitoring and storing of information received via the coordinator, characterized in that each of the programmable active RFID transceiver devices consist of an external caplamp battery (CB), a first light emitting diode (L1), a voltage regulator (VR), a turnover switch (TS), an internal battery supply (BS), a safety arrangement (SA), an embedded radio (ER), a programming port (PR), a universal asynchronous receiver-transmitter output (UO), an analog to digital converter (Al), a buzzer (BU), a message switch (MS), and a second light emitting diode (L2); wherein the external caplamp battery (CB) is connected to light emitting diode (L1) and voltage regulator (VR); the voltage regulator (VR) is connected to the turnover switch (TS); the turnover switch (TS) is connected to the internal battery supply (BS) and the safety arrangement (SA); the safety arrangement (SA) is connected to the programming port (PR) and the embedded radio (ER); and the embedded radio (ER) is separately connected to the programming port (PR), the universal asynchronous receiver-transmitter output (UO), the analog to digital converter input (AI), the buzzer (BU), the message switch (MS), and the second light emitting diode (L2).

2. The tracking and monitoring system for opencast mines, as claimed in claim 1, wherein at least one of the plurality of the programmable active RFID transceiver devices is a Zigbee-compliant device.

3. The tracking and monitoring system for opencast mines, as claimed in claim 1, wherein a message transmitter is connected to the plurality of programmable active RFID transceiver devices by an RS232 serial port for sending key-pad typed messages from any end device /router/coordinator to a particular end device or coordinator having the microprocessor based computer and storage device, the message transmitter including key pad switches (KS), a microcontroller (MC), an LCD display (LD), a latch (LA),a. UART interfacing IC (UT), and an RS232 serial output port (RS); wherein the key pad switches (KS) are connected to microcontroller (MC); the microcontroller (MC) is separately connected to the LCD display (LD), the latch (LA) and the UART interfacing IC (UT); the latch (LA) and the LCD display (LD) are connected with each other; and the UART interfacing IC (UT) is connected to the RS232 serial output port (RS).

4. The tracking and monitoring system for opencast mines, as claimed in claim 1, wherein the plurality of programmable active RFID transceiver devices are provided with resident hardware specific embedded software to act as coordinator, router and end device forms an IEEE 802.15.4-based mesh network for tracking of vehicles and equipment by wireless sensor networking in opencast mines.

5. The tracking and monitoring system for opencast mines, as claimed in claim 1, wherein the resident wireless sensor network application software is provided with the following modules: i) tracking of vehicles and equipment, (ii) performance analysis of shovel-dumper combination, (iii) optimum placement of shovels, (iv) computerized attendance, (v) collision prevention and sending alert signal, and (vi) two-way message communication.

6. The tracking and monitoring system for opencast mines, as claimed in claim 1, wherein the resident hardware specific embedded software for programming the plurality of programmable active RFID transceiver devices to function as coordinator, router and end devices to collectively form a dynamic wireless network is compiled and debugged in an IAR Embedded Workbench and TI-MAC Library using 'C' language.

7. The tracking and monitoring system for opencast mines, as claimed in claim 1, wherein the tracking and monitoring system is capable of automatically forming a dynamic network among one or more undisturbed and reachable routers so that communication does not get disturbed in the whole mine.

8. A tracking and monitoring system for opencast mines, as claimed in claim 1, wherein the tracking and monitoring system is a low-powered, easy to install and cost-effective system for opencast mines.

9. A method of tracking and monitoring vehicles and equipment in opencast mines using a tracking and monitoring system comprising:

(i) providing a combination of a plurality of programmable active RFID transceiver devices in communication with a microprocessor based computing and storage device, said plurality of programmable active RFID transceiver devices being programmable to operate as coordinators, routers and end devices and having resident hardware specific embedded software capable of forming a dynamic wireless network among themselves such that a first plurality of said plurality of programmable active RFID transceiver devices are programmed as routers which are strategically placed to form an unified wireless mesh-networking infrastructure, wherein each of the programmed routers is capable of transmitting and receiving signals from one or more other routers, end devices, and one of said plurality of programmable active RFID transceiver devices which is programmed as a coordinator, the coordinator capable of receiving and transmitting signals to said routers and said microprocessor based computing and storage device, wherein said microprocessor based computing and storage device is provided with resident wireless sensor network application software for tracking, monitoring and storing of information received via the coordinator, characterized in that each of the programmable active RFID transceiver devices consist of an external caplamp battery (CB), a first light emitting diode (L1), a voltage regulator (VR), a turnover switch (TS), an internal battery supply (BS), a safety arrangement (SA), an embedded radio (ER), a programming port (PR), a universal asynchronous receiver-transmitter output (UO), an analog to digital converter (Al), a buzzer (BU), a message switch (MS), and a second light emitting diode (L2); wherein the external caplamp battery (CB) is connected to light emitting diode (L1) and voltage regulator (VR); the voltage regulator (VR) is connected to the turnover switch (TS); the turnover switch (TS) is connected to the internal battery supply (BS) and the safety arrangement (SA); the safety arrangement (SA) is connected to the programming port (PR) and the embedded radio (ER); and the embedded radio (ER) is separately connected to the programming port (PR), the universal asynchronous receiver-transmitter output (UO), the analog to digital converter input (AI), the buzzer (BU), the message switch (MS), and the second light emitting diode (L2);

(ii) programming the plurality of programmable active RFID transceiver devices to operate as one of a coordinator, routers and end devices;

(iii) assigning the programmable active RFID transceiver devices programmed as end devices to one or more vehicles, personnel and equipment of an opencast mine;

(iv) placing the programmable active RFID transceiver devices programmed as routers at various locations of the opencast mine, characterized in that the programmed routers are configured to automatically form dynamic wireless mesh network among themselves, a programmable active RFID transceiver device programmed as a coordinator, and the programmed end devices positioned at one or more locations of the mine; and (v) receiving information from one or more of the programmed routers by the programmed coordinator, the programmed coordinator being configured to send the information to the microprocessor based computing and storage device, wherein the microprocessor based computing and storage device is configured to:

(a) track vehicles and equipment in the opencast mine;

(b) establish two-way message communication among the end devices, wherein the two-way message communication is facilitated by setting a Universal Asynchronous Receiver/Transmitter (UART) buffer of end devices;

(c) automatically perform optimal shovel-dumpers performance at one or more loading points and graphically display results;

(d) perform optimum placement of shovels;

(e) maintain computerized attendance of personnel working in the opencast mines; and (f) prevent collisions and sending alert signals.

10. The method as claimed in claim 9, wherein the step of programming the plurality of programmable active RFID transceiver devices comprises:

(i) assigning network identification and addresses to a plurality of programmable active RFID transceiver devices for defining one or more coordinator, router and end device;

(ii) declaring associated devices of each programmable active RFID transceiver device;

(iii) incorporating power saving algorithm in the end devices;

(iv) adjusting timer and range for transmission of signals for each programmable active RFID transceiver device; and (v) compiling and debugging programming of the programmable active RFID transceiver devices in an IAR Embedded Workbench and TI-MAC Library using 'C ' language for making the RFID devices ready.

11. The method as claimed in claim 10, wherein step of providing a combination of a plurality of programmable active RFID transceiver devices comprises providing ZigBee-enabled Active RFID devices.

12. The method as claimed in claim 9, wherein step of providing a combination of a plurality of programmable active RFID transceiver devices comprises providing ZigBee-enabled Active RFID devices.

* * * * *